(No Model.)
O. FRÖLICH.
ELECTRICAL MEASURING INSTRUMENT.
No. 497,539. Patented May 16, 1893.
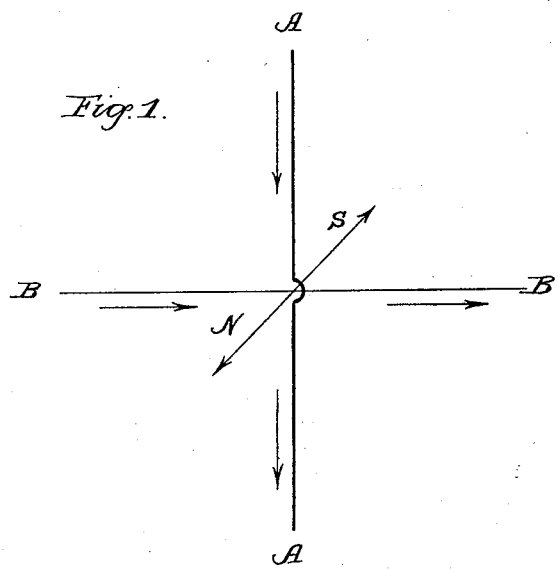
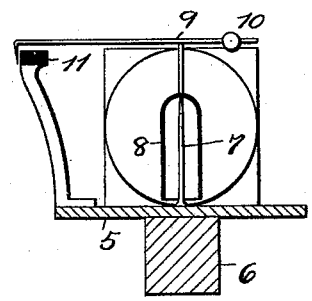
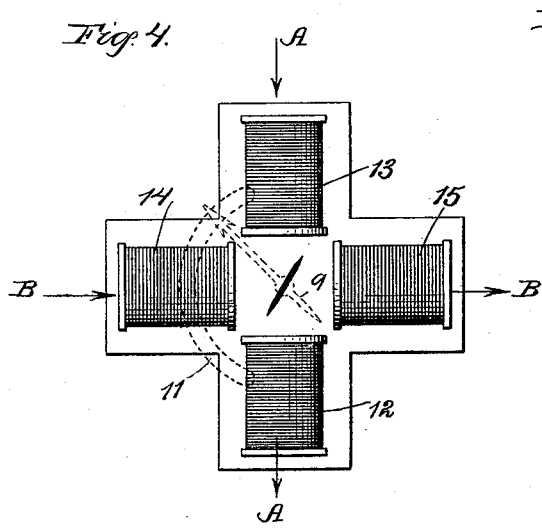
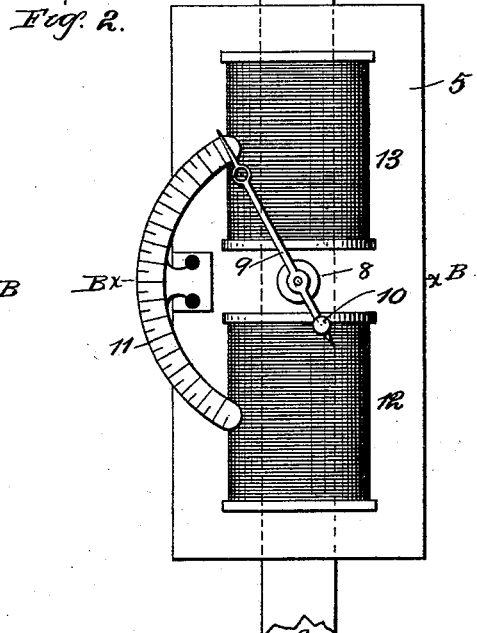
WITNESSES:
John M. Deemer
Timothy F. Dillon
INVENTOR
Oscar Frölich
BY
Geo. H. Benjamin
ATTORNEY.

UNITED STATES PATENT OFFICE.

OSCAR FRÖLICH, OF BERLIN, GERMANY, ASSIGNOR TO SIEMENS & HALSKE OF SAME PLACE.

ELECTRICAL MEASURING-INSTRUMENT.

SPECIFICATION forming part of Letters Patent No. 497,539, dated May 16, 1893.

Application filed October 25, 1892. Serial No. 449,954. (No model.) Patented in Germany August 18, 1888, No. 47,373.

*To all whom it may concern:*

Be it known that I, OSCAR FRÖLICH, a citizen of Switzerland, residing at the city of Berlin, in the German Empire, have invented new and useful Improvements in Electrical Measuring-Instruments, (for which German Patent No. 47,373, dated August 18, 1888, has been granted to me,) of which the following is a specification.

My invention relates to electrical measuring instruments of the type usually employed for measuring the potential or quantity of electrical currents. In such instruments, it is necessary, or at least desirable, for many technical and practical reasons, that the indications of the instruments are not, in any measure, dependent upon the magnetism of the needle, the influence of the earth's magnetism or currents, or magnetic influences which may exist in the neighborhood of the instrument.

Referring to the accompanying drawings which illustrate my invention, and in which similar letters and numerals of reference indicate like parts: Figure 1 is a diagram, explanatory of the principle of my invention. Fig. 2 is a top view of an electrical measuring instrument; Fig. 3, a vertical section on the line $x$—$x$ of Fig. 2; and Fig. 4 is a top view showing a modification of Fig. 1.

The fundamental idea, carried out by the present invention, is the following: If two currents A A and B B, which cross each other at a right or other angle, are permitted to act upon a magnetic needle N S, pivotally or otherwise supported at the point of crossing of the two currents, and so as to be freely movable, the direction assumed by the needle will be the resultant of the two forces acting upon it. If the currents A A and B B transmitted are sufficiently strong, the position assumed by the needle, and hence the reading of the instrument, will not be dependent upon the magnetic moment of the needle, the earth's magnetism, or be in any wise influenced by the currents or magnets situated in the vicinity, but will depend entirely upon the relative strength of the two currents transmitted through the instrument acting upon it. If one of these two currents, for instance A A, is kept constant, the deflection of the needle will give the measure for the other current B B.

In the drawings, Fig. 2, 5 represents a suitable plate or support, made of non-magnetic material. Fastened to the back of this support is a copper rail or conductor 6, and located in about the center of the plate, and supported upon a needle point 7, is a bell-shaped portion of soft iron 8, which corresponds to the magnetic needle N S. In other forms of my device, I may use a needle suspended by a very fine thread.

Attached to the top of the bell-shaped portion 8 is an indicating pointer 9, counterweighted at 10.

11 is a scale over which the pointer travels, and arranged on each side of the bell-shaped portion 8 are electro-magnets 12 and 13. A current traversing the wire coils of the electro-magnets 12 and 13 tends to place the needle (bell-shaped portion and pointer) parallel to the copper rail, while the current flowing through the copper rail tends to place the needle in a vertical position to the first mentioned direction. If the current in the copper rail 6 be maintained constant, the deflection of the needle will be the measure for the current traversing the coils of the electro-magnets 12 and 13. If the current in the coils of the electro-magnets is constant, the deflection of the needle is the measure for the current in the copper rail. In electrolytical plants, the current flowing through the bath is used as the constant element and sent through the copper rail 6, while the coils of the electro-magnets 12 and 13 are interposed between two points of different tension (in the baths).

In illuminating plants, where a constant electro-motive force is employed in the main conductors, the coils of the electro-magnets are interposed between the conductors, while the current to be measured is sent through the copper rail. The instrument thus serves, in the first case, to measure the electro-motive force of the current; in the latter, to measure the quantity of current flowing in the conductors. The copper rail 6 can be replaced by the two coils 14 and 15 of Fig. 4.

I claim as my invention—

1. An electrical measuring instrument, comprising a conductor producing a field of force, a pair of electro-magnets, the cores of which are arranged parallel to said first named conductor for producing a second field of force, the lines of which will be at right angles to those of the field of force of the first named conductor, a device adapted to be acted upon by said fields of force, a pointer attached to said device, and a scale over which the pointer travels, whereby the resultant of the two acting forces is visibly indicated.

2. An electrical measuring instrument, comprising a conductor, a pair of electro-magnets, the coils of which are parallel with the conductor, a pivoted bell-shaped portion of soft metal located between the opposite poles of the magnets, a pointer on said bell-shaped portion, and a scale over which the pointer moves.

3. An electrical measuring instrument, comprising two conductive circuits of dissimilar resistance, adapted to create two independent magnetic fields, the lines of force of which theoretically cross each other, and a device so located and mounted as to be acted upon by said fields of force and which, by its degree of movement, will indicate the resultant of the two acting forces.

4. An electrical measuring instrument, comprising two conductive circuits of dissimilar resistance, adapted to create two independent magnetic fields, the lines of force of which theoretically cross each other, one of said fields maintained constant, or practically so, and the other variable, and a device so located and mounted as to be acted upon by said fields of force, and not affected by external influences, and which, by its degree of movement, will indicate the resultant of the two acting forces.

In testimony whereof I have affixed my signature in the presence of two witnesses.

OSCAR FRÖLICH.

Witnesses:
GUSTAV STENZEL,
MAX WAGNER.